US012607397B2

(12) United States Patent
Anderson et al.

(10) Patent No.: US 12,607,397 B2
(45) Date of Patent: Apr. 21, 2026

(54) REFRIGERATOR WITH INVENTORY TRACKING

(71) Applicant: Springhouse Technologies Inc., McLean, VA (US)

(72) Inventors: John Anderson, Brooklyn, NY (US); Tyler Sanborn, Queens, NY (US); Boris Kontorovich, Brooklyn, NY (US); Charles Parks, Laramie, WY (US); Jennifer O'Neil, Boulder, CO (US); Bryce Copenhaver, Brooklyn, NY (US); Robert Marsh, Ponte Vedra Beach, FL (US); Travis Ruddy, Dayton, OH (US)

(73) Assignee: Springhouse Technologies Inc., McLean, VA (US)

( * ) Notice: Subject to any disclaimer, the term of this patent is extended or adjusted under 35 U.S.C. 154(b) by 61 days.

(21) Appl. No.: 18/638,955

(22) Filed: Apr. 18, 2024

(65) Prior Publication Data

US 2025/0327615 A1     Oct. 23, 2025

(51) Int. Cl.
*F25D 25/00*      (2006.01)
*G06T 7/73*      (2017.01)
(Continued)

(52) U.S. Cl.
CPC ................ *F25D 25/00* (2013.01); *G06T 7/73* (2017.01); *G06V 20/50* (2022.01); *H04N 7/188* (2013.01);
(Continued)

(58) Field of Classification Search
CPC .. F25D 25/00; F25D 2500/06; F25D 2700/02; G06T 7/73; G06V 20/50; H04N 7/188
See application file for complete search history.

(56) References Cited

U.S. PATENT DOCUMENTS 11,692,769  B2      7/2023   Morris et al.
2015/0002660  A1      1/2015   Lee et al.
(Continued)

FOREIGN PATENT DOCUMENTS

DE      102020202933  A1      9/2021

OTHER PUBLICATIONS

International Search report filed in PCT/US2025/023101 mailed Jun. 25, 2025.

*Primary Examiner* — Jared Walker
(74) *Attorney, Agent, or Firm* — RANKIN, HILL & CLARK LLP

(57)      ABSTRACT

A refrigerator includes a main body, a door, at least one camera mounted to the main body and/or the door and at least one computing device. The camera(s) is/are positioned to have a field of view that includes an entrance opening leading to a storage compartment and an interior side of the door when the door is open. The camera(s) is/are configured to capture images of an item being loaded into or being removed from the storage compartment. The computing device(s) can instruct the camera(s) to capture the images, analyze the captured images and determine whether the images contain an object of interest. The computing device (s) can assign a sensed door angle and an object location to images containing the object of interest. The computing device(s) can assign a direction of movement for the object of interest based on the sensed door angle and changes in the object location.

13 Claims, 5 Drawing Sheets

(51) Int. Cl.
G06V 20/50       (2022.01)
H04N 7/18       (2006.01)

(52) U.S. Cl.
CPC ...... *F25D 2500/06* (2013.01); *F25D 2700/02* (2013.01)

(56)             References Cited

U.S. PATENT DOCUMENTS

| | | | |
|---|---|---|---|
| 2016/0088262 A1* | 3/2016 | Lee | G06F 3/167 |
| | | | 704/275 |
| 2016/0217417 A1* | 7/2016 | Ma | G06Q 10/087 |
| 2017/0097185 A1* | 4/2017 | Yasaka | E05F 15/614 |
| 2020/0134291 A1* | 4/2020 | Kim | G06V 20/64 |
| 2021/0019232 A1 | 1/2021 | Murti et al. | |
| 2021/0192329 A1* | 6/2021 | Shin | F25D 29/00 |
| 2022/0325946 A1 | 10/2022 | Schroeder et al. | |
| 2022/0414391 A1 | 12/2022 | Schroeder et al. | |
| 2023/0057240 A1 | 2/2023 | Schroeder | |
| 2023/0058922 A1 | 2/2023 | Schroeder | |
| 2023/0097905 A1* | 3/2023 | Schroeder | G06F 18/25 |
| | | | 382/156 |

\* cited by examiner

REFRIGERATOR WITH INVENTORY TRACKING

BACKGROUND

Known refrigerators can include a camera for imaging and recording inventory disposed in an interior of the refrigerator. Some known refrigerators include cameras for imaging and recording inventory where the cameras are located and designed to each have a field of view directed toward an interior of the refrigerator. When inventory items are placed in such refrigerators at locations that obscure view of other items from the camera, the camera has difficulty accurately recording the obscured inventory.

US 2016/0088262 A1 discloses a refrigerator that includes an imaging unit, a data storage unit, a control unit and a display unit. The imaging unit generates a goods loading/unloading video through video recording of storage goods loaded into or unloaded from the refrigerator. The data storage unit stores the goods loading/unloading video, goods information that may be stored in the refrigerator, and storage items information. The control unit recognizes loading/unloading of goods based on an optical flow detected through vision recognition from the goods loading/unloading video, and updates the storage items information in the refrigerator based on recognition information generated through vision recognition on loading/unloading of the goods and the goods information stored in the data storage unit. The display unit displays a managed state of storage items for a user based on the updated storage items information.

U.S. Pat. No. 11,692,769 B2 discloses a refrigerator appliance including a cabinet defining a chilled chamber, a door rotatably hinged to the cabinet to provide selective access to the chilled chamber, and a camera assembly mounted to the cabinet for monitoring the chilled chamber. A controller is operably coupled to the camera assembly and is configured to obtain a raw image using the camera assembly, analyze the raw image to identify an anchor object, crop the raw image to generate a reduced image surrounding the anchor object, and analyze the reduced image to identify a food item being added to or removed from the chilled chamber.

Inventory tracking for a refrigerator can be improved by taking into account aspects of the refrigerator and/or images obtained by the camera(s) that were not considered in the prior art documents discussed above.

SUMMARY

In view of the foregoing, a refrigerator includes a main body and a door pivotally mounted to and movable with respect to the main body, at least one camera mounted to at least one of the main body and the door and at least one computing device in operable connection with the camera(s). The main body and the door define at least one storage compartment within a refrigerated enclosure when the door is in the closed position. The camera(s) is/are positioned to have a field of view that includes an entrance opening leading to the storage compartment(s) and an interior side of the door when the door is open. The camera(s) is/are configured to capture images of an item being loaded into or being removed from the storage compartment(s). The computing device(s) is/are configured to instruct the camera(s) to capture the images based on a trigger signal received by the computing device(s), to analyze the captured images by the camera(s) and determine whether the images contain an object of interest. The computing device(s) is/are also configured to assign a sensed door angle and an object location to each of n images among the analyzed images containing the object of interest. The sensed door angle assigned with a respective image among the n images corresponds to an angle of the door with respect to the main body when the respective image was captured and the object location corresponds to a coordinate position for the object of interest in the respective image. The computing device(s) is/are also configured to assign a direction of movement for the object of interest being at least one of into, out of or internally within the refrigerated enclosure. The direction of movement is assigned based on the sensed door angle assigned with each of the n images and changes in the object location among the n images.

DETAILED DESCRIPTION

Figure 1:
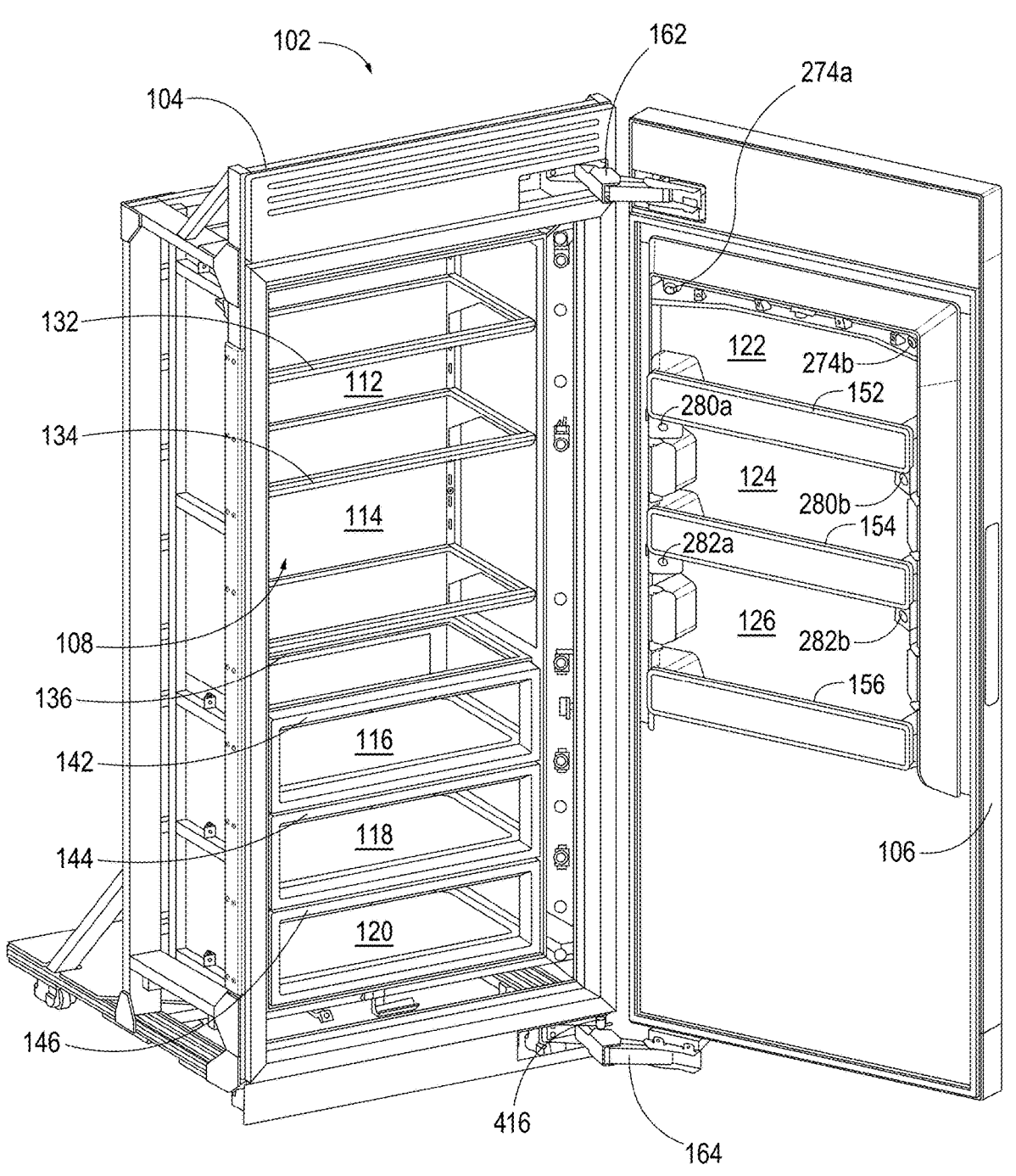
FIG. 1 is a perspective view of a refrigerator with a door shown in an open position.

Referring to FIG. 1, a refrigerator 102 includes a main body 104 and a door 106 pivotally mounted to and movable with respect to the main body 104. Similar to known refrigerators, the door 106 is movable between a plurality of open positions, one of which being shown in FIG. 1, and a closed position. The main body 104 and the door 106 define at least one storage compartment within a refrigerated enclosure 108 when the door 106 is in the closed position. As illustrated, the main body 104 and the door 106 define a plurality of storage compartments 112, 114, 116, 118, 120, 122, 124, 126 within the refrigerated enclosure 108 when the door 106 is in the closed position. The plurality of storage compartments includes a first storage compartment 112, a second storage compartment 114, a third storage compartment 116, a fourth storage compartment 118, a fifth storage compartment 120, which are each located within the main body 104 in the illustrated embodiment, and a sixth storage compartment 122, a seventh storage compartment 124, and an eighth storage compartment 126, which are located on an interior side 128 the door 106 in the illustrated embodiment. The number and location of the storage compartments 112, 114, 116, 118, 120, 122, 124, 126 may differ from that shown in FIGS. 1 and 2.

As illustrated in FIG. 1, a first shelf 132 and a second shelf 134 are disposed in the first storage compartment 112. A third shelf 136 is disposed in the second storage compartment 114. A first drawer 142 is disposed in the third storage compartment 116. A second drawer 144 is disposed in the fourth storage compartment 118. A third drawer 146 disposed in the fifth storage compartment 120. A first bin 152 is disposed in the sixth storage compartment 122. A second bin 154 is disposed in the seventh storage compartment 124. A third bin 156 is disposed in the eighth storage compartment 126.

The door 106 is connected to the main body 104 through an upper hinge 162 and a lower hinge 164 in the illustrated embodiment. The door 106 is movable with respect to the main body 104 among a plurality of open positions based on an angle of the door 106 with respect to the main body 104.

Each storage compartment 112, 114, 116, 118, 120, 122, 124, 126 defines a respective entrance opening through which items may be placed into and taken out of the corresponding storage compartment. More specifically and with reference to FIG. 2, the first storage compartment 112 defines a first entrance opening 172 leading onto the first shelf 132 and the second shelf 134, and the second storage compartment 114 defines a second entrance opening 174 leading onto the third shelf 136. The third storage compartment 116 defines a third entrance opening (not visible in FIGS. 1 and 2) leading into the first drawer 142, the fourth storage compartment 118 defines a fourth entrance opening (not visible in FIGS. 1 and 2) leading into the second drawer 144, and the fifth storage compartment 120 defines a fifth entrance opening (not visible in FIGS. 1 and 2) leading into the third drawer 146 when the respective drawers 142, 144, 146 are opened. The sixth storage compartment 122 defines a sixth entrance opening 180 leading into the first bin 152, the seventh storage compartment 124 defines a seventh entrance opening 182 leading into the second bin 154, and the eighth storage compartment 126 defines an eighth entrance opening 184 leading into the third bin 156.

Figure 2:
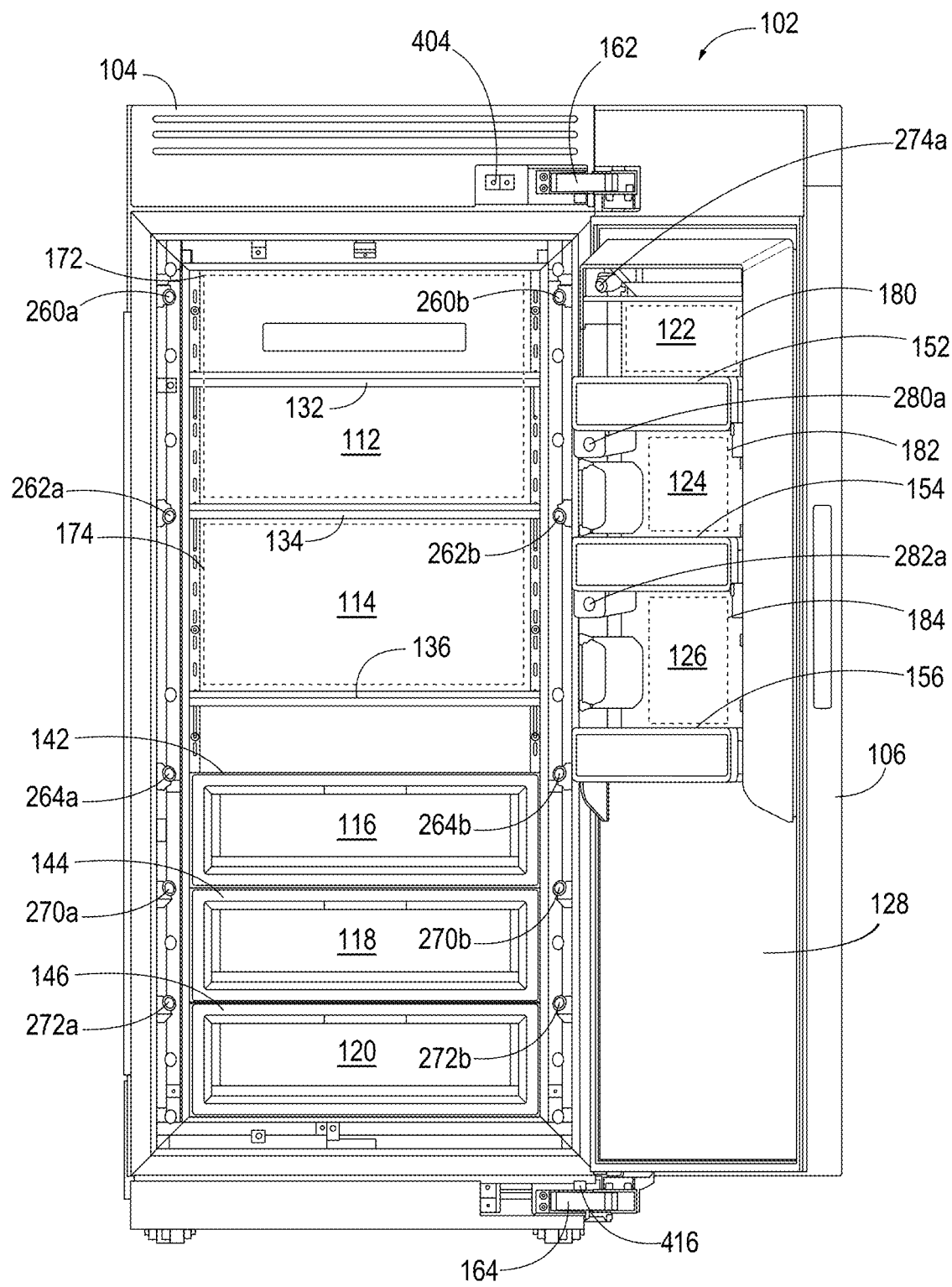
FIG. 2 is a front view of the refrigerator with a door shown in an open position.

At least one camera mounts to at least one of the main body 104 and the door 106. As illustrated in FIGS. 1 and 2, a plurality of cameras 250 (see FIG. 3) is mounted to the main body 104 and the door 106 for capturing images of objects moving into and out of the plurality of storage compartments 112, 114, 116, 118, 120, 122, 124, 126. The plurality of cameras 250 includes a first set of cameras 260a, 260b mounted on the main body 104 associated with the first storage compartment 112, a second set of cameras 262a, 262b mounted on the main body 104 associated the second storage compartment 114, a third set of cameras 264a, 264b mounted on the main body 104 associated with the third storage compartment 116, a fourth set of cameras 270a, 270b mounted on the main body 104 associated with the fourth storage compartment 118, and a fifth set of cameras 272a, 272b mounted on the main body 104 associated with the fifth storage compartment 120. As more clearly seen in FIG. 1, the plurality of cameras 250 also includes a sixth set of cameras 274a, 274b mounted on the door 106 associated with the sixth storage compartment 122, a seventh set of cameras 280a, 280b mounted on the door 106 associated with the seventh storage compartment 124, and an eighth set of cameras 282a, 282b mounted on the door 106 associated with the eighth storage compartment 126.

As shown between FIGS. 1 and 2, the cameras with a suffix "a" are positioned at a left side of the corresponding storage compartment, and the cameras with a suffix "b" are positioned at a right side of the corresponding storage compartment. Instead of having a field of view towards the interior of the refrigerator 102, each camera 260a, 260b, 262a, 262b, 264a, 264b, 266a, 266b, 270a, 270b, 272a, 272b on the main body 104 has a field of view directed away from the interior of the refrigerator 102. Each camera 274a, 274b, 280a, 280b, 282a, 282b on the door 106 also has a field of view directed away from the interior of the refrigerator 102 when the door 106 is in an open position. The first set of cameras 260a, 260b are positioned in a top portion of the first storage compartment 112 above the first shelf 132 and the second shelf 134 with a field of view encompassing the first entrance opening 172. The second set of cameras 262a, 262b are positioned at a top portion of the second storage compartment 114 above the third shelf 136 with a field of view encompassing the second entrance opening 174. The third set of cameras 264a, 264b are positioned above the first drawer 142 with a field of view encompassing the third entrance opening (not visible in FIGS. 1 and 2) leading into the first drawer 142 when the first drawer 142 is opened. The fourth set of cameras 270a, 272b are positioned above the second drawer 144 with a field of view encompassing the fourth entrance opening (not visible in FIGS. 1 and 2) leading into the second drawer 144 when the second drawer 144 is opened. The fifth set of cameras 272a, 272b are positioned above the third drawer 146 with a field of view encompassing the fifth entrance opening (not visible in FIGS. 1 and 2) leading into the third drawer 146 when the third drawer 146 is opened. The sixth set of cameras 274a, 274b are mounted to the door 106 above the first bin 152 with a field of view encompassing the sixth entrance opening 180. The seventh set of cameras 280a, 280b are mounted to the door 106 above the second bin 154 with a field of view encompassing the seventh entrance opening 182. The eighth set of cameras 282a, 282b are mounted to the door 106 above the third bin 156 with a field of view encompassing the eighth entrance opening 184.

In this manner, each camera 260a, 260b, 262a, 262b, 264a, 264b, 272a, 272b, 274a, 274b, 280a, 280b, 282a, 282b in the plurality of cameras 250 is positioned to have a field of view that includes a respective entrance opening 172, 174, 180, 182, 184 leading to the corresponding storage compartment 112, 114, 116, 118, 120, 122, 124, 126 when the door 106 is in the open position. With this construction, the plurality of cameras 250 is configured to capture images of an item passing through any of the entrance openings 172, 174, 180, 182, 184 as the item is being loaded into or is being removed from the corresponding storage compartment 112, 114, 116, 118, 120, 122, 124, 126. As seen in FIGS. 1 and 2, particular cameras, e.g., cameras 260a, 262a, 264a, 270a, 272a, 274a, 274b, 280a, 280b, 282a, 282b, also have a field of view that can include the interior side 128 of the door 106 when the door 106 is in at least one of the plurality of open positions. The angle of the door 106 with respect to the main body 104 can be useful to determine the direction of the item, e.g., whether the item is being loaded into or being removed from the corresponding storage compartment 112, 114, 116, 118, 120, 122, 124, 126, when analyzing images that are captured by the cameras 260a, 260b, 262a, 262b, 264a, 264b, 272a, 272b, 274a, 274b, 280a, 280b, 282a, 282b.

Figure 3:
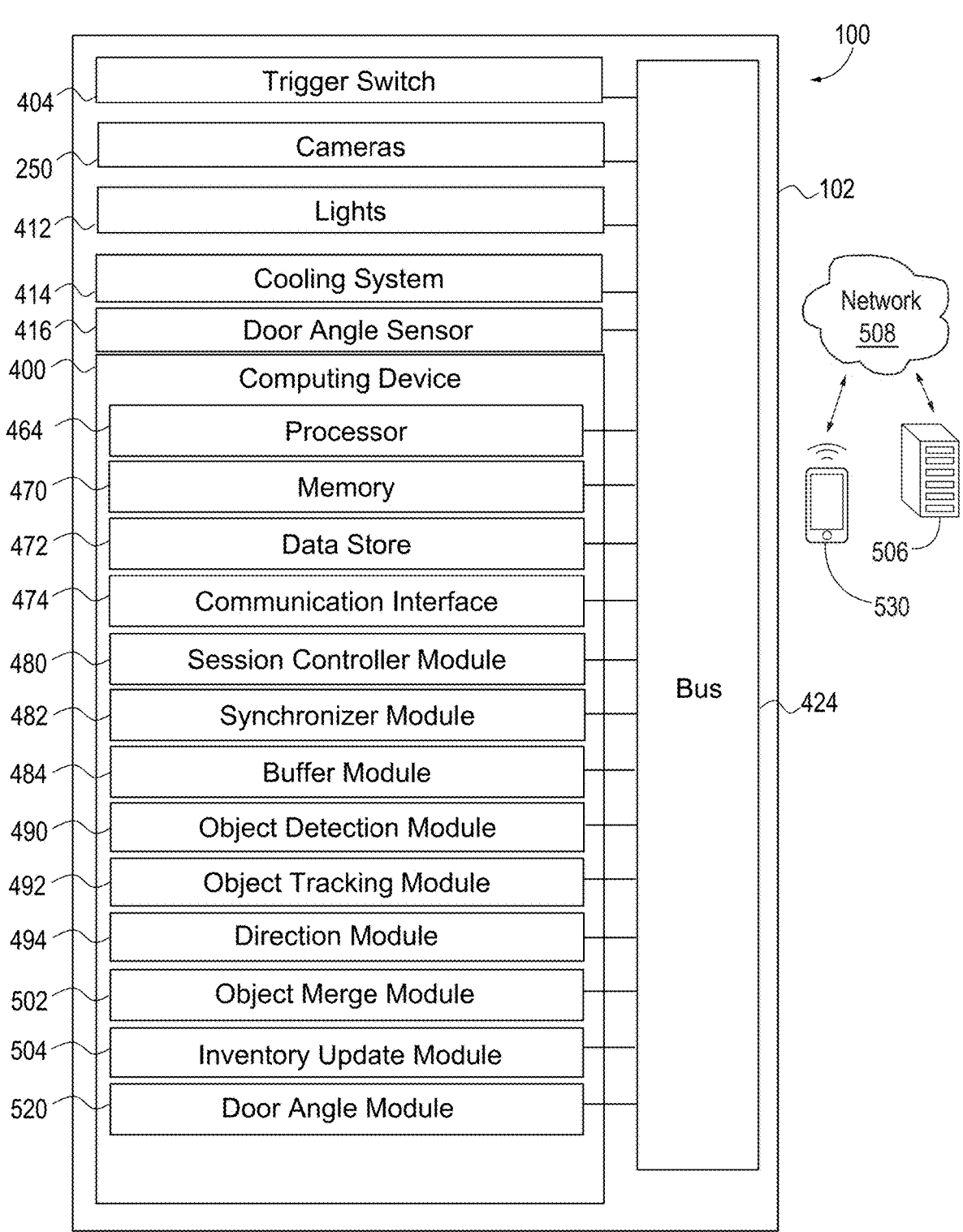
FIG. 3 is a block diagram representing an operating environment of a refrigerator including an inventory tracking system.

With reference to FIG. 3, the refrigerator 102 includes a computing device 400 in operable connection with each camera of the plurality of cameras 250. With continued reference to FIG. 3, the refrigerator 102 can also include a trigger switch 404, lights 412, a cooling system 414 and a door angle sensor 416. The trigger switch 404, the plurality of cameras 250, the lights 412, the cooling system 414 and the door angle sensor 416 can connect with the computing device 400 via a bus 424, or similar type of electrical connection.

The trigger switch 404 is operably connected with the computing device 400 and configured for detecting a position of the door 106 to indicate whether the door 106 is in one of the open positions or the closed position. The trigger switch 404 is configured to send a trigger signal to the computing device 400 based on whether the door 106 is in one of the open positions or the closed position. More specifically, the trigger switch 404 can be configured to send a start trigger signal to the computing device 400 when the door 106 moves from the closed position toward one of the open positions, and the trigger switch 404 can be configured to send a stop trigger signal to the computing device 400 when the door 106 moves to the closed position. The trigger switch 404 may include at least one of various types of position sensors such as mechanical switches, potentiometers, piezoelectric sensors, Hall effect sensors, and eddy-current sensors without departing from the scope of the present disclosure. Also, while the trigger switch 404 is shown disposed on the main body 104, the trigger switch 404 may additionally or alternatively be positioned on the door 106.

The computing device 400 controls the lights 412 (only depicted schematically in FIG. 3, but similar to lights in known refrigerators). Operation of the lights 412 can be controlled by the state of the trigger switch 404 similar to lights in known refrigerators. Operation of the lights 412 can also be controlled by the computing device 400 for optimized processing by computer vision models described below.

The cooling system 414 can be similar to those found in known refrigerators, and therefore will not be described in detail. The cooling system 414 can include temperature sensors for sensing temperatures within the refrigerator 102 and air blower fans supplying air cooled by cooling devices (not shown), which can include a compressor (not shown) compressing refrigerant, a condenser (not shown) condensing the compressed refrigerant, an expansion valve (not shown) decompressing the condensed refrigerant, and an evaporator (not shown) evaporating the decompressed refrigerant.

The door angle sensor 416 is configured to determine the angle of the door 106 with respect to the main body 104. The door angle sensor 416, for example, could include a rotary encoder having a shaft the rotates as the door 106 pivots with respect to the main body 104 to output and communicate with the computing device 400 to communicate the relative angular position of the door 106 with respect to the main body 104.

Figure 4:
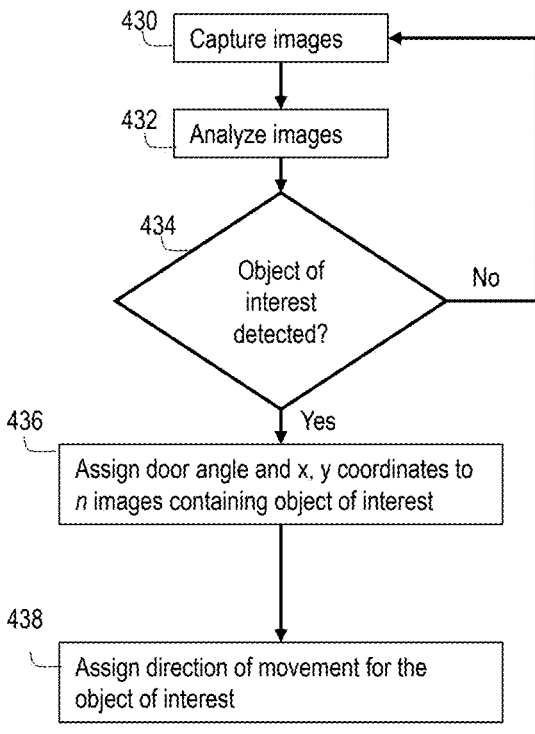
FIG. 4 is a process flow chart for assigning direction of an item into, out of or within the refrigerator.

With reference to FIGS. 3 and 4, the computing device 400 is generally configured to instruct at least one camera among the plurality of cameras 250 to capture images (block 430 in FIG. 4) based on a trigger signal received by the computing device 400. The trigger signal can be sent by the trigger switch 404 to the computing device 400. The computing device 400 is also configured to analyze the images (block 432 in FIG. 4) captured by the plurality of cameras 250 and to determine whether the images contain an object of interest (block 434 in FIG. 4), which corresponds to an item being loaded into or removed from the refrigerator. The computing device 400 is also configured to assign a sensed door angle and an object location to each of n images (block 436 in FIG. 4) among the images determined to contain the object of interest. The sensed door angle assigned with a respective image among the n images corresponds to an angle of the door with respect to the main body when the respective image was captured. The object location corresponds to a point overlapped by the object of interest in the respective image. The computing device 400 is also configured to assign a direction of movement for the object of interest (block 438 in FIG. 4) being at least one of into, out of or internally within the refrigerated enclosure. The direction of movement is assigned based on the sensed door angle assigned with each of the n images and changes in the object location among the n images.

To accomplish the tasks described above, the computing device 400 can include a processor 464, a memory 470, a data store 472, and a communication interface 474, which are each operably connected for computer communication via the bus 424. The communication interface 474 provides software and hardware to facilitate data input and output between the components of the computing device 400 and other components, networks, and data sources, which will be described herein. The computing device 400 can also include a session controller module 480, a synchronizer module 482, a buffer module 484, an object detection module 490, an object tracking module 492, a direction module 494, an object merge module 502 and an inventory update module 504.

The session controller module 480 is configured to start a session and to instruct each camera in the plurality of cameras 250 to begin capturing images based on the start trigger signal received by the session controller module 480 from the trigger switch 404. The plurality of cameras 250 begin capturing images after the session controller module 480 receives the start trigger signal from the trigger switch 404, and the plurality of cameras 250 cease capturing images after the session controller module 480 receives the stop trigger signal from the trigger switch 404. Each camera in the plurality of cameras 250 and/or the computing device 400 can be configured to compress captured images, to assign a session identification (ID), to assign a camera identification (ID) and to assign a frame identification (ID) for each captured image and send the compressed images along with their respective session ID, camera ID and frame ID to the synchronizer module 482, which can occur during or after a session, which is the time between opening and closing of the door 106. A session can be relatively long and may include the transferring of multiple items into and out of the refrigerator 102.

The synchronizer module 482 is configured to receive captured images and the session ID, camera ID and frame ID associated with each captured image from the plurality of cameras 250, and to group the captured images into frame sets based on the frame ID associated with each captured image. Each frame set is made up of respective captured images that were captured at the same time from different cameras among the plurality of cameras 250. In an embodiment, the synchronizer module 482 groups captured images from the plurality of cameras 250 based on the frame ID associated with each image. In this regard, the same frame ID among different captured images indicates the images were taken at the same time albeit from different cameras. The synchronizer module 482 receives the session ID and the camera ID, in addition to the frame ID for each captured image received from each camera in the plurality of cameras 250. The session ID is associated with the session assigned by the session controller module 480, the camera ID is associated with a particular camera among the plurality of cameras 250 that captured the captured image, and the frame ID, as mentioned above, is associated with a time at which the captured image was captured.

The buffer module 484 is configured to store compressed captured images as an image buffer memory, and is configured to send the compressed captured images to a remote server, e.g., a remote server 506 (FIG. 3) via a network 508, such as the internet, for post processing after the session ends. With this construction, system resources of the computing device 400 may be directed to image capture during the session, and then directed to post processing when the session has ended, thereby reducing a capacity of the computing device 400 required for receiving image information from the plurality of cameras 250 and tracking inventory in the refrigerator 102.

Figure 5:
FIG. 5 is an example of an analyzed image containing an object of interest.

With reference to FIGS. 3 and 5, the object detection module 490 employs a computer vision algorithm that identifies objects within an image or video. More particularly, the object detection module 490 is configured to determine whether each captured image in a respective frame set contains an object of interest 512, to define a bounding box 514 around each object of interest 512 located in the respective captured image and to assign a class identification to the object of interest 512. Class identifications assigned by the object detection module 490 indicate an inventory type of the object of interest 512. The inventory type can be maintained in the memory 470 and/or data store 472 of the computing device 400 or stored remotely and accessed via the network 508. The inventory type may indicate a category of ingredient, food product, meal, dish, or other object type maintained in the database. FIG. 5 is an example of one image that was captured by a camera among the plurality of cameras 250, and many more similar images from the same and different cameras are analyzed at block 432 (FIG. 4) and bounding boxes (similar to the bounding box 512) can be generated at block 432 in FIG. 4.

The object detection module 490 includes a computer vision model that outputs the bounding box 514 (FIG. 5) around the object of interest 512 (FIG. 5) and the class identification for the object of interest 512 for captured images containing the object of interest 512. In an embodiment, the computer vision model is YOLOv5, however the object detection module 490 may include additional or alternative computer vision models for determining object presence and class identification in the refrigerator 102 without departing from the scope of the present disclosure. The computer vision model used in the object detection module 490 can also be configured to remove images from frame sets received from the synchronizer module 482 that do not contain an object of interest and to output an updated group of images to the object tracking module 492. The updated group of images, which may include only captured images that contain an object of interest, may include a lesser number of images as compared to the frame set received by object detection module 490 from the synchronizer module 482. The first captured image that contains an object of interest in the updated group of images can indicate the start of a sequence, which indicates one hand motion in or out of the refrigerator. The last captured image that contains an object of interest in the updated group of images can indicate the end of the sequence. Where the object detection module 490 identifies no object of interest, for example the object detection module 490 identifies an empty hand without any object to be loaded into or removed from the refrigerator, the last captured image containing the object of interest can indicate the end of the sequence. Each sequence, or detected motion in or out of the refrigerator 102, can contain multiple objects of interest. For example, a person could insert two items, e.g., a lemon and a cup of yogurt, into or out of the refrigerator in a single sequence. In such an instance, the object detection module 490 assigns a first class identification to the lemon that appears as one object of interest in the captured image and assigns a second class identification to the cup of yogurt that appears as another object of interest in the captured image.

The object tracking module 492 is configured to analyze sequential captured images from each camera in the plurality of cameras 250 tracking objects of interest among the sequential captured images per camera. For example, the object tracking module 492 can compare a first n images captured in the updated group of images during a sequence to a last n images captured in the updated group of images during the sequence to track movement of objects of interest during the sequence. The number n of images in the illustrated embodiment is three, but the number could be higher or lower. Determination of the temporal sequence of captured images is based on the frame ID associated with each image. For example, captured images having a higher frame ID can be captured later in time as compared to those with a lower frame ID. Determination of the camera that captured a respective captured image is based on the camera ID associated with the respective captured image. In this regard, the object tracking module 492 associates an object of interest with itself across sequential images per camera, thereby tracking movement of the object of interest over time.

The object tracking module 492 can also be configured to assign track identifications to associate the object of interest in one analyzed image to the object of interest in other analyzed images per camera in the plurality of cameras 250. Track identifications assigned by the object tracking module 492 are unique to each camera in the plurality of cameras 250, and unique to each object of interest captured by the plurality of cameras 250 in sequential captured images. For example, the object tracking module 492 is configured to assign a different track identification to an object of interest that appears as a lemon in the captured images than the track identification for an object of interest that appears as a cup of yogurt in the captured images.

The object tracking module 492 can employ an observation-centric simple online and real-time tracking (OCSORT) algorithm for analyzing the sequential captured images from each camera in the plurality of cameras 250. With this construction, the object tracking module 492 receives the updated group of images with bounding boxes and class IDs from the object detection module 490 and the OCSORT algorithm can process the updated group of images, and then output a further updated group of images with the bounding boxes, class IDs and additionally include associated track IDs for each object located in each captured image in the further updated group of images.

The direction module 494 employs a computer algorithm to provide real-time direction prediction of moving objects within video streams. Leveraging input parameters such as object location, e.g., x, y coordinates, associated with the object of interest and door angles, e.g., the angle of the door 106 with respect to the main body 104, the direction module 494 can track changes in bounding box area or size and x, y coordinates. Operating across the entire video, the direction module 494 can yield predictions for each camera among the plurality of cameras 250.

The direction module 494 can be configured to assign a direction to each sequence to determine if the object of interest is moving into, out of or internally within the refrigerated enclosure. The direction module 494 can employ a machine learning algorithm, e.g., a vision transformer such as CSWin Transformer or another machine learning algorithm capable of performing the functions described herein. Alternatively, the direction module 494 can employ a rule-based algorithm. Moreover, the direction module 494 could employ both a rule-based algorithm and a machine learning algorithm.

When employing the rule-based algorithm and/or the machine learning algorithm, the direction module 494 can receive the sensed door angle and the object location associated with the object of interest as input parameters. For example, the sensed door angle and the object location associated with the object of interest for the first n analyzed images and the last n analyzed images during a sequence can be received by the direction module 494 the object detection module 490 or the object tracking module 492. The number n can be three images; however, a fewer or greater number could be used. Because the analyzed images are those that contain the object of interest, the first n analyzed images are indicative of the object entering a particular camera's field of view and the last n images are indicative of the object leaving the particular camera's field of view.

Changes in the angle of the door 106 with respect to the main body 104 can result in variations in object appearance, scale, orientation, and occlusion for at least some cameras among the plurality of cameras 250. For example, because the cameras 274a, 274b, 280a, 280b, 282a, 282b mounted to the door 106 can move with respect to the main body 104, knowing the angle of the door 106 with respect to the main body 104 when a particular image is captured can provide useful information when assessing changes in the object location associated with the object of interest among the first n analyzed images and the last n analyzed images during a sequence. Moreover, because the storage compartments 122, 124 and 126 on the door 106 move with respect to the cameras 260a, 260b, 262a, 262b, 264a, 264b, 272a, 272b mounted to the main body 104, the angle of the door 106 with respect to the main body 104 can provide useful information when assessing changes in the object location associated with the object of interest among the first n analyzed images and the last n analyzed images during a sequence. Additionally, changes in the sensed door angle among the n analyzed images can at least in part be used when assigning the direction of movement of the object of interest within the sequence. The changes in the sensed door angle among the n analyzed images can be changes in magnitude, i.e., the difference in degrees or radians, and/or changes in direction, i.e., in the door opening direction or the door closing direction.

The object location associated with the object of interest corresponds to a point overlapped by the object of interest in each of the n analyzed images. For example, the computing device 400, e.g., within the object detection module 490, can be configured to generate the bounding box 514 around the object of interest 512 and the object location for a similar predetermined location within each bounding box for each image among the n analyzed images can be assigned, e.g., within the object detection module 490 or the direction module 494. In a more particular example, the computing device 400, e.g., within the object detection module 490 or the direction module 494, is configured to locate the centroid, or geometric center, of the bounding box 514 around the object of interest 512 within the first n analyzed images and the last n analyzed images. The location of the geometric center within each analyzed image and the change of location of the centroid from one analyzed image to another provides an indication of movement and the direction of movement of the object of interest that is bound by the bounding box.

More particular to when employing the rule-based algorithm, the direction module 494 can determine the direction of the object of interest 512 with reference to a corresponding entrance opening 172, 174, 180, 182, 184 in a three-dimensional grid space, over time between sequential images, and across multiple cameras in the plurality of cameras 250. In an embodiment, the direction module 494 compares the first captured image to the last captured image by the plurality of cameras 250 during a sequence to determine the direction. The rule-based algorithm is configured to determine of the direction of movement of the object of interest within the sequence based on knowing the location of each camera of the plurality of cameras 250 with respect to the entrance openings 172, 174, 180, 182, 184, for example. With reference back to FIGS. 1 and 2, the location of the first set of cameras 260a, 260b with respect to the first entrance opening 172 is known due to the mounting location of the first set of cameras 260a, 260b on the main body 104 with respect to the first entrance opening 172. Because the location of the first set of cameras 260a, 260b with respect to the first entrance opening 172 is known, the location of the first entrance opening 172 within each cameras' 260a, 260b field of view is also known. If the first captured image of the sequence detects the object on internal side of a plane defined by the first entrance opening 172 and the last captured of the sequence detects the object on an external side of the plane defined by the first entrance opening 172, then the direction module 494 can assign a direction for the object as going out of the refrigerator 102. In contrast, if the first captured image of the sequence detects the object on the external side of the plane defined by the first entrance opening 172 and the last captured of the sequence detects the object on the internal side of the plane defined by the first entrance opening 172, then the direction module 494 can assign a direction for the object as going into the refrigerator 102.

With reference to FIG. 3, the computing device 400 can also include a door angle module 520 that is configured to determine the sensed door angle based on features extracted from the respective image among the n images captured by a respective camera mounted to the main body 104. For example, any of the cameras 260a, 262a, 264a, 270a, 272a on the left side of the main body 104 in FIG. 2 can be used to capture an image of the door 106 in one of the plurality of open positions. Features, e.g., the location of the lens of the camera 280a, the location of the lens of the camera 280b and the location of the lens of the camera 274a, can be extracted from the image to determine angle of the door 106 with respect to the main body 104 because scale and orientation of the aforementioned three locations is different for each door angle. Accordingly, the door angle module 520 can be used to sense the door the sensed door angle in lieu of the door angle sensor 416.

The object merge module 502 employs a computer algorithm that consolidates the direction predictions obtained from multiple cameras among the plurality of cameras 250. The object merge module 502 algorithm processes predictions from each camera, identifying unique inventory changes, and combines the results to produce a comprehensive and consolidated set of predictions. The object merge module 502 algorithm receives predictions from multiple cameras, which can be organized as a dictionary (cam_to-_preds), where each camera is associated with a list of predictions. Each prediction can be represented as a tuple (track_id, class_id, change), where track_id is a unique identifier for the object of interest 512, class_id indicates the class of the object of interest 512, and change signifies the detected directional change in the object of interest 512, e.g., into, out of or no change with respect to the refrigerated enclosure 108. The algorithm within the object merge module 502 can then iterate through the predictions for each camera associating the track_id's across multiple cameras according to the movement of the object of interest, creating a unique identifier (inventory_change_id) for each inventory change based on the class identification for the object of interest 512 and the detected change. The object merge module 502 algorithm can then count the occurrences of each unique inventory change within each camera's predictions and then combines the counts of each unique inventory change across all cameras. If a particular inventory change is observed in multiple cameras, the object merge module 502 algorithm retains the maximum count, increasing the likelihood of an accurate representation of the overall occurrence. The consolidated results are stored in a format that captures the class_id, change, and the count of occurrences. The final result is a list of lists, each containing the class_id (food), inventory change, and the number of inventory changes for that item observed across all cameras.

The inventory update module 504 is configured to communicate with the memory 470 and/or the data store 472 via the bus 424 and/or the remote server 506 via the network 508 to update an inventory status of at least one storage compartment in the plurality of storage compartments 112, 114, 116, 118, 120, 122, 124, 126 based on each inventory change and the direction assigned thereto. The inventory update module 504 can also be configured to send all captured images of a session to the remote server 506 via a data pipeline routed through the network 508. The inventory update module 504 can also be configured to package corresponding sequence data including object identification information, track identification information, and direction information for each merge identification, and to send the sequence data to the object storage service with the captured images.

When an object of interest is detected as going out of the refrigerator 102 by the direction module 494, then the item that was located in the refrigerator and was the object of interest associated with that particular item, is removed from the inventory of the refrigerator. This inventory information can be stored in the memory 470, the data store 472 and/or the remote server 506 and can be output to an application accessible by a portable device 530 for viewing the inventory information on a display of the portable device 530.

Figure 6:
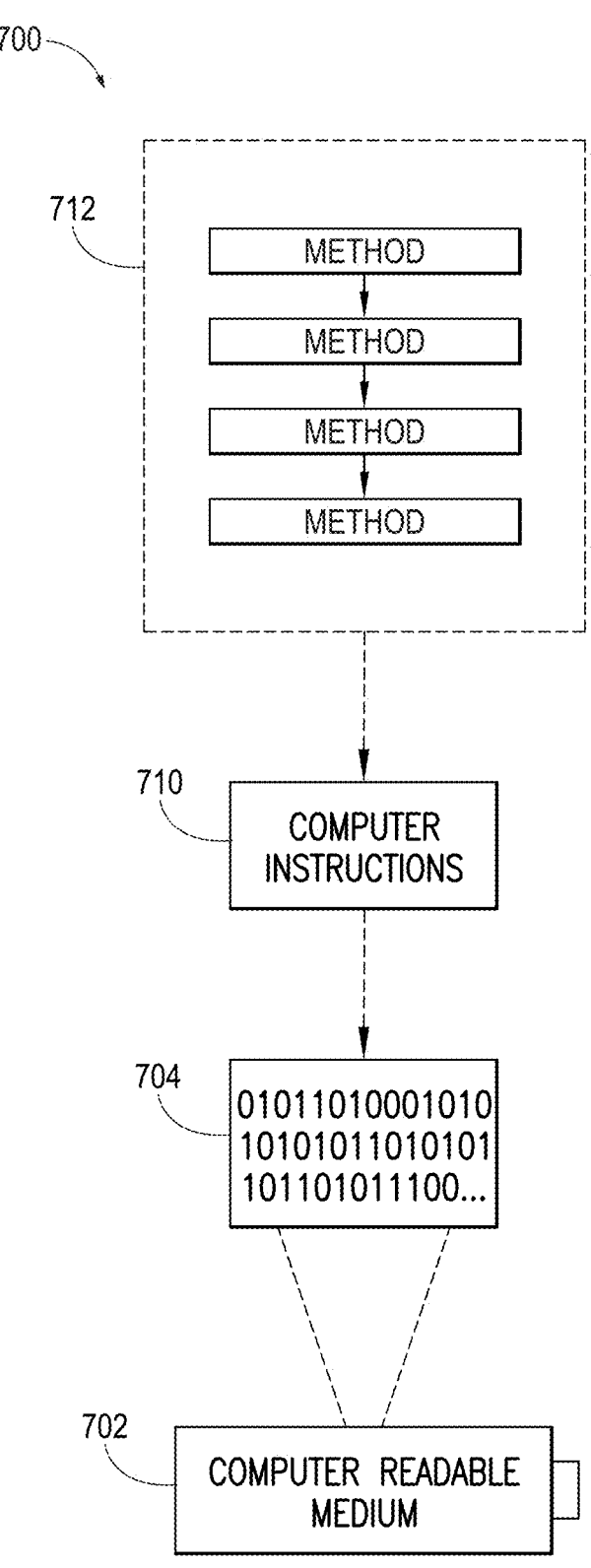
FIG. 6 is an illustration of a computer-readable medium or computer-readable device including processor-executable instructions configured to embody one or more of the provisions set forth herein.

An aspect of the present disclosure involves a computer-readable medium including processor-executable instructions configured to implement at least one aspect of the techniques presented herein. An aspect of a computer-readable medium or a computer-readable device devised in these ways is illustrated in FIG. 6, where an implementation 700 includes a computer-readable medium 702, such as a CD-R, DVD-R, flash drive, a platter of a hard disk drive, etc., on which is encoded computer-readable data 704. This encoded computer-readable data 704, such as binary data including a plurality of zero's and one's as shown in FIG. 6, in turn includes a set of processor-executable computer instructions 710 configured to operate according to one or more of the principles set forth herein. In this implementation 700, the processor-executable computer instructions 710 may be configured to perform a method 712, such as the method of FIG. 4. In another aspect, the processor-executable computer instructions 710 may be configured to implement a system, such as the operating environment 100 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various aspects of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A refrigerator comprising:

a main body and a door pivotally mounted to and movable with respect to the main body between a plurality of open positions and a closed position, the main body and the door defining at least one storage compartment within a refrigerated enclosure when the door is in the closed position;

at least one camera mounted to at least one of the main body and the door, the at least one camera positioned to have a field of view that includes an entrance opening leading to the at least one storage compartment and an interior side of the door when the door is in at least one of the plurality of open positions, the at least one camera being configured to capture images of an item being loaded into or being removed from the at least one storage compartment; and at least one computing device in operable connection with the at least one camera, the at least one computing device configured to:

instruct the at least one camera to capture the images based on a trigger signal received by the at least one computing device;

analyze the captured images from the at least one camera and determine whether the images contain an object of interest;

assign a sensed door angle and an object location to each of n images among the analyzed images containing the object of interest, wherein the sensed door angle assigned with a respective image among the n images corresponds to an angle of the door with respect to the main body when the respective image was captured and the object location corresponds to a coordinate position for the object of interest in the respective image; and assign a direction of movement for the object of interest being at least one of into, out of or internally within the refrigerated enclosure, wherein the direction of movement is assigned based at least in part on changes in the sensed door angle among the n images and changes in the object location among the n images.

2. The refrigerator of claim 1, further comprising a door angle sensor in communication with the at least one computing device and configured to determine the sensed door angle.

3. The refrigerator of claim 2, wherein the door angle sensor is a rotary encoder.

4. The refrigerator of claim 1, wherein the at least one computing device is further configured to determine the sensed door angle based on features extracted from the respective image among the n images captured by a respective camera mounted to the main body.

5. The refrigerator of claim 1, wherein the at least one computing device is further configured to generate a bounding box around the object of interest and to assign the object location within each bounding box for each image among the n images.

6. The refrigerator of claim 5, wherein the object location corresponds to the geometric center of the bounding box.

7. The refrigerator of claim 6, wherein the object location is defined by an x and y coordinate, and the at least one computing device is further configured to assign the direction of movement of the object of interest at least in part based on changes in x and y coordinates among the n images.

8. The refrigerator of claim 1, wherein the at least one computing device is further configured to assign the direction of movement of the object of interest at least in part based on changes in magnitude in the sensed door angle among the n images.

9. The refrigerator of claim 1, wherein the at least one computing device is further configured to assign the direction of movement of the object of interest at least in part based on changes in direction in the sensed door angle among the n images.

10. The refrigerator of claim 1, wherein the at least one camera includes a respective camera mounted to the door so as to be movable with the door and with respect to the body.

11. The refrigerator of claim 1, wherein the at least one computing device is further configured to assign the direction of movement of the object of interest using a machine learning algorithm using the sensed door angle and the object location as input parameters.

12. The refrigerator of claim 1, wherein the at least one computing device is further configured to assign the direction of movement of the object of interest using a rule-based algorithm using the sensed door angle and the object location as input parameters.

13. A non-transitory computer readable storage medium storing instructions that, when executed by a computer having a processor, cause the processor to perform a method comprising:

instructing at least one camera to capture images based on a trigger signal received by the processor;

analyzing the images captured by the at least one camera and to determine whether the images contain an object of interest;

assigning a sensed door angle and an object location to each of n images among the images determined to contain the object of interest, wherein the sensed door angle assigned with a respective image among the n images corresponds to an angle of a door with respect to a main body of a refrigerator when the respective image was captured and the object location corresponds to a point overlapped by the object of interest in the respective image; and assigning a direction of movement for the object of interest being at least one of into, out of or internally within a refrigerated enclosure of the refrigerator, wherein the direction of movement is assigned based at least in part on changes in the sensed door angle among the n images and changes in the object location among the n images.

\*   \*   \*   \*   \*